United States Patent
Sahu et al.

(10) Patent No.: US 9,775,022 B1
(45) Date of Patent: Sep. 26, 2017

(54) MANAGING MULTI-ACTIVE COMMUNICATION ON A MULTI-SUBSCRIPTION MULTI-STANDBY COMMUNICATION DEVICE

(71) Applicant: QUALCOMM Incorporated, San Diego, CA (US)

(72) Inventors: Debesh Kumar Sahu, Hyderabad (IN); Tushar Gupta, Hyderabad (IN); Vishnu Vardhan Kasilya Sudarsan, Hyderabad (IN); Raja Chitikela, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/066,146

(22) Filed: Mar. 10, 2016

(51) Int. Cl.
| | |
|---|---|
| *H04W 8/18* | (2009.01) |
| *H04B 1/3816* | (2015.01) |
| *H04W 8/08* | (2009.01) |
| H04W 88/06 | (2009.01) |
| H04W 84/12 | (2009.01) |
| H04W 84/04 | (2009.01) |

(52) U.S. Cl.
CPC .......... H04W 8/183 (2013.01); H04B 1/3816 (2013.01); H04W 8/08 (2013.01); *H04W 84/042* (2013.01); *H04W 84/12* (2013.01); *H04W 88/06* (2013.01)

(58) Field of Classification Search
CPC ..... H04W 88/06; H04W 88/02; H04W 8/183; H04W 72/1215; H04W 36/28; H04W 36/30
See application file for complete search history.

(56) References Cited

U.S. PATENT DOCUMENTS

| | | | |
|---|---|---|---|
| 9,131,429 B1 | 9/2015 | Bharadwaj et al. | |
| 2007/0026862 A1* | 2/2007 | Hicks | H04W 36/30 455/436 |
| 2011/0103359 A1* | 5/2011 | Cho | H04N 7/148 370/338 |
| 2013/0242783 A1* | 9/2013 | Horn | H04W 24/10 370/252 |

(Continued)

FOREIGN PATENT DOCUMENTS

| | | |
|---|---|---|
| WO | 2015105813 A2 | 7/2015 |
| WO | 2015180138 A1 | 12/2015 |
| WO | 2016014928 A1 | 1/2016 |

OTHER PUBLICATIONS

'N' Group, "White Paper on Dual Mode Phone (GSM & Wi-Fi)," Mar. 5, 2008, pp. 1-12.

(Continued)

*Primary Examiner* — Wesley Kim
*Assistant Examiner* — Dong-Chang Shiue
(74) *Attorney, Agent, or Firm* — The Marbury Group

(57) ABSTRACT

Examples include systems and methods for managing multi-active communication on a multi-subscription multi-standby (MSMS) communication device. The device processor may change a first protocol stack of a first subscription and a second protocol stack of a second subscription of the MSMS communication device to a multi-active mode in response to determining that all of one or more packet data network connections of the first subscription are transferred to a Wi-Fi communication link.

30 Claims, 10 Drawing Sheets

(56) References Cited

U.S. PATENT DOCUMENTS

| | | | |
|---|---|---|---|
| 2014/0176659 A1* | 6/2014 | Khay-Ibbat | H04N 7/148 348/14.02 |
| 2014/0274047 A1* | 9/2014 | Dhanda | H04W 40/02 455/435.1 |
| 2014/0328177 A1 | 11/2014 | Zhao et al. | |
| 2015/0092553 A1* | 4/2015 | Sirotkin | H04W 28/08 370/235 |
| 2015/0131619 A1 | 5/2015 | Zhu et al. | |
| 2015/0327207 A1 | 11/2015 | Bharadwaj | |
| 2016/0105844 A1* | 4/2016 | Morita | H04W 48/18 455/552.1 |

OTHER PUBLICATIONS

Womate 3G, "Womate 3G Dual SIM Adapter Standby Wifi Wireless Router for iPhone iPod iPad," Dual Sim Adapter 3G Wifi—Simultaneous Connection, Retrieved dated on Dec. 15, 2015, Retrieved from the Internet URL: http://www.simore.com/en/dual-sim-card-adapter-wifi-ios-womate-3g.html, 3 pages.

International Search Report and Written Opinion—PCT/US2017/020170—ISA/EPO—May 18, 2017.

\* cited by examiner

MANAGING MULTI-ACTIVE COMMUNICATION ON A MULTI-SUBSCRIPTION MULTI-STANDBY COMMUNICATION DEVICE

BACKGROUND

A multi-subscription multi-standby (MSMS) device may include two or more subscriber identity module (SIM) cards, each associated with a different service provider subscription. An MSMS communication device may support a range of communication technologies and configurations, including both cellular and Wi-Fi. For example, in an MSMS communication device (for example, a Dual-SIM Dual-Standby (DSDS) device), two or more SIMs share one radio. In contrast, in a multi-subscription multi-active (MSMA) device (for example, a Dual-SIM Dual-Active (DSDA) device), two or more SIMs may establish two or more concurrent communication sessions using two or more radios. MSMS devices and MSMA devices may use different radio access technology (RAT) protocols with different subscriptions. Such RATs may include 3GPP Long Term Evolution (LTE), Global System for Mobility (GSM), Single-Carrier Radio Transmission Technology (1×RTT), and others.

Many times an end-user device may be connected with a Wi-Fi access point (e.g., in the office or at home). Conventional MSMS communication devices conducting a Voice over Wi-Fi (also referred to as Wi-Fi Calling, or WFC) using a first subscription may be unable to monitor a second subscription for paging messages, or cannot enter into an active state and identify the caller party number to perform a call switch to an incoming call (e.g., that may be indicated by a paging message). A network operator may enable WFC on a network, which enables the switching of Voice over LTE (VOLTE) or Video Telephony (VT) calls to Wi-Fi (connected through an Evolved Packet Data Gateway (ePDG) backend to an IP Multimedia System (IMS) core) when Wi-Fi is available. However, while many network operators are enabling WFC, in many current communication device designs (e.g., in DSDS devices), the modem and the telephony layer have not been designed to monitor for a paging message over another subscription. Current communication devices have also not been designed to receive incoming voice calls over another subscription while the device conducts an active voice call over WFC.

So, for example, an MSMS communication device may prevent a tuning of its radio frequency (RF) resource away from the first subscription (that is conducting a voice call) to a second subscription to conduct an active communication session on the second subscription. The MSMS communication device may therefore not respond to one or more paging messages sent from the communication network of the second subscription when the MSMS communication device is conducting an active communication session on the first subscription using WFC. For example, with reference to FIG. 1A, in current LTE+GSM/1×RTT (LTE+G/1×) DSDS design, when a communication device (e.g., communication device 102a) conducts an active voice call using WFC using a first subscription on a first communication network (e.g., via access point 108a), the communication device 102a may monitor 1×/G paging messages on a second subscription (e.g., via base station 104a), but the communication device 102a cannot setup the call on the subscription or determine the caller's identity. As a result, important calls may be missed. As another example, with reference to FIG. 1B, when a communication device (e.g., communication device 102b) conducts a voice call using 1×/G on a second subscription (e.g., via the access point 108b), the communication device 102b may not be designed to set up a call over the first subscription (e.g., if the call is in WFC) assuming that radio frequency (RF) chains of the communication device 102b are dedicated for use by second subscription voice calls (e.g., as in a traditional DSDS device design). Again, important calls may be missed.

SUMMARY

Systems, methods, and devices of various examples enable managing multi-active communication on a multi-subscription multi-standby (MSMS) communication device. Various examples include changing a first protocol stack of a first subscription and a second protocol stack of a second subscription of the MSMS communication device to a multi-active mode in response to determining that all of one or more packet data network connections of the first subscription are transferred to a Wi-Fi communication link.

Some examples may further include determining whether a signal level of the Wi-Fi communication link meets a threshold signal level, and transferring the one or more packet data network connections of the first subscription of the MSMS communication device from a first cellular communication link to the Wi-Fi communication link in response to determining that the Wi-Fi communication link meets the threshold signal level. Some examples may further include decreasing an arbitration priority of the first subscription in response to determining that not all of the one or more packet data network connections of the first subscription are transferred to the Wi-Fi communication link.

Some examples may further include placing one or more layers of the first protocol stack in a low power mode. Some examples may further include conducting a first communication session using the first subscription over the Wi-Fi communication link and a second communication session using the second subscription over a second cellular communication link. Some examples may further include monitoring the Wi-Fi communication link to determine whether the Wi-Fi communication link meets the threshold signal level, and transferring the one or more packet data network connections of the first subscription from the Wi-Fi communication link to the first cellular communication link in response to determining that the Wi-Fi communication link does not meet the threshold signal level. Some examples may further include changing the first protocol stack and the second protocol stack to a multi-standby mode. Some examples may further include removing one or more layers of the first protocol stack from a low power mode.

In some examples, transferring one or more packet data network connections of the first subscription of the MSMS communication device from the first cellular communication link to the Wi-Fi communication link may include transferring one or more packet data network connections of the first subscription from the first cellular communication link to the Wi-Fi communication link and transferring one or more packet data network connections of the second subscription from a second cellular communication link to the Wi-Fi communication link in response to determining that the Wi-Fi communication link meets the threshold signal level. Some examples may further include conducting a first communication session using the first subscription over the Wi-Fi communication link and a second communication session using the second subscription over the Wi-Fi communication link.

Various examples may include a multi-subscription multi-standby communication device including a processor configured with processor-executable instructions to perform operations of the example methods summarized above. Various examples may include a non-transitory processor-readable storage medium having stored thereon processor-executable software instructions configured to cause a processor to perform operations of the example methods summarized above. Various examples may include a multi-subscription multi-standby communication device that includes means for performing functions of the operations of the example methods summarized above.

BRIEF DESCRIPTION OF THE DRAWINGS

The accompanying drawings, which are incorporated herein and constitute part of this specification, illustrate examples that, together with the general description given above and the detailed description given below, the drawings serve to explain, but not to limit, features of the various examples.

DETAILED DESCRIPTION

Figure 1A:
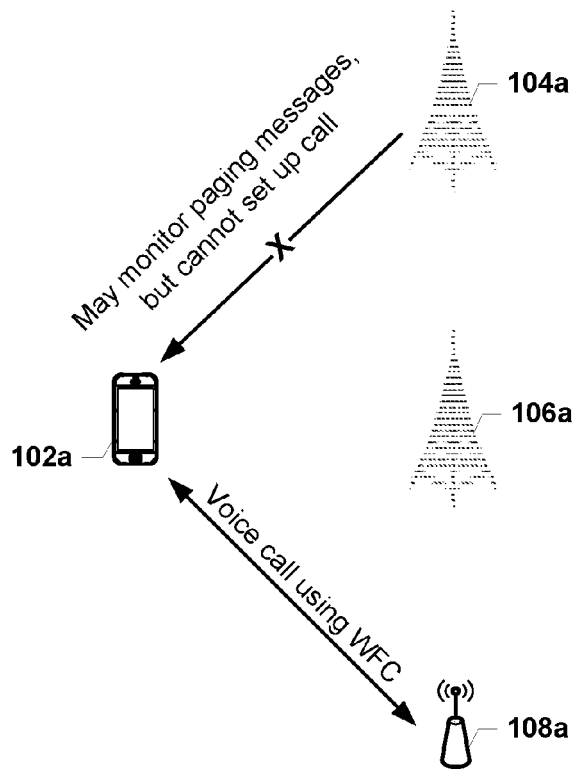
FIGS. 1A and 1B are component block diagrams illustrating conventional communication systems.
Figure 1B:
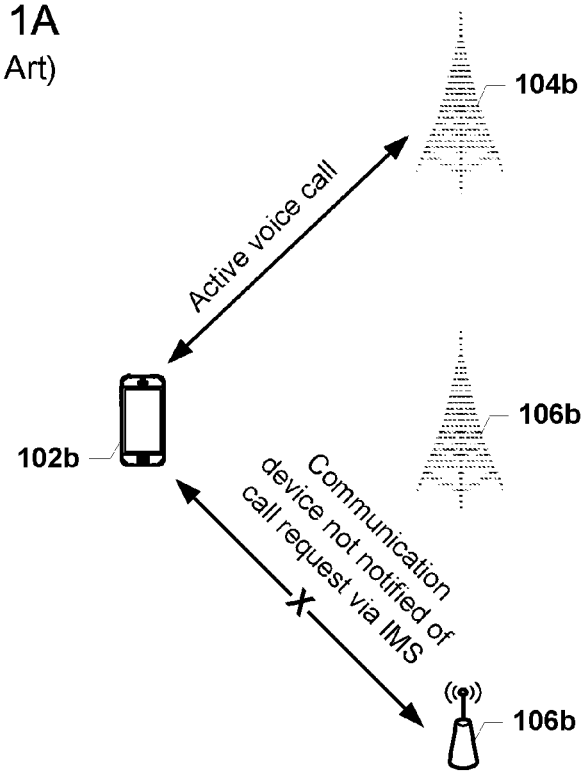

Various examples will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various examples include methods implemented on multi-subscription multi-standby communication devices for dynamically enabling and conducting multi-active communications on the multi-subscription multi-standby communication device when a wireless local area network (WLAN), such as a Wi-Fi network, with Internet access is available.

The terms "multi-subscription multi-standby communication device" and "MSMS communication device" refer to any one or all of cellular telephones, smartphones, personal or mobile multi-media players, personal data assistants, laptop computers, tablet computers, smartbooks, palmtop computers, wireless electronic mail receivers, multimedia Internet enabled cellular telephones, wireless gaming controllers, and similar electronic devices and portable computing platforms which include a programmable processor, a memory, and one or more shared RF resources, and which are configured to support communications over two or more subscriptions. Various examples may be particularly useful in any communication devices that can support multiple wireless wide area network subscriptions and communication sessions with two or more communication networks.

The term "multi-active communication" refers to the conduct of two or more concurrent or simultaneous active communication sessions by a communication device, including by a multi-subscription multi-standby communication device.

The terms "component," "system," "unit," and the like as used herein are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. Components may communicate by way of local and/or remote processes, function or procedure calls, electronic signals, data packets, memory read/writes, and other known computer, processor, and/or process related communication methodologies.

References to "first network," "first subscription," "second network" and "second subscription" are arbitrary and are used to refer to two or more subscriptions/networks generally. In some examples, at any given time either subscription/network may be in an active mode (on an active voice or data call) or a standby mode. For example, at a first time, a first subscription with a first network may be on an active data call (and thus a "first subscription) while a second subscription with a second network is in the standby mode (and thus a "second" subscription), and at a second time, the second subscription may enter an active data call (becoming the "first" subscription) and the first subscription may enter the standby mode (becoming the "second" subscription). In some examples, such as during multi-active communication, two (or more) subscriptions/networks may be in an active mode. In addition, references to "first" and "second" subscriptions and networks are not intended to imply that the examples are limited to two subscriptions, because the MSMS communication device may include three or more subscriptions.

An MSMS communication device conducting a Voice over Wi-Fi (also referred to as Wi-Fi Calling, or WFC) using a first subscription may monitor a second subscription for paging messages but typically cannot enter into an active state on the second subscription, e.g., to identify a caller party number (e.g., that may be indicated by a paging message), to perform a call switch to an incoming call, or to perform other functions on the second subscription. In some examples, the MSMS communication device may prevent a tuning of the shared radio frequency (RF) resource away from the first subscription (that is conducting a voice call) to a second subscription to conduct an active communication session on the second subscription. Therefore, the MSMS communication device may not respond to one or more paging messages sent from the communication network of the second subscription when the MSMS communication device is conducting an active communication session on the first subscription using WFC.

The various examples enable a processor of a multi-subscription multi-standby communication device to dynamically enable and conduct multi-active communications by enabling one or more multi-active communication sessions to be conducted over Wi-Fi. In some examples, the processor may further conduct one or more multi-active communication sessions over a cellular communication link while concurrently conducting one or more multi-active communication sessions over Wi-Fi.

In some examples, the MSMS communication device may detect a signal from a Wi-Fi access point and may establish a Wi-Fi communication link with the Wi-Fi access point. The MSMS communication device may determine whether a signal level of the Wi-Fi access node meets a signal level threshold, and in response to determining that the signal level meets the signal level threshold, the MSMS communication device may establish the communication link with the Wi-Fi access point. In some examples, a connectivity engine of the MSMS communication device may detect the signal from the Wi-Fi access point, and may determine whether the Wi-Fi signal meets the signal level threshold. In response to determining that the Wi-Fi signal level meets the signal level threshold, the MSMS communication device may establish a communication link with the Wi-Fi access point. Subsequently, the MSMS communication device may establish communication with a first subscription network via the Wi-Fi communication link.

In some examples, the MSMS communication device may establish communications with the first subscription network over the Wi-Fi communication link based on one or more additional criteria, for example, a load utilization of the Wi-Fi access point, and an available data throughput or available data capacity via the Wi-Fi access point.

The MSMS communication device may attempt to transfer one or more packet data network (PDN) connections of the first subscription to the Wi-Fi communication link. In some examples, the MSMS communication device may transfer all mandatory PDN connections (which may include one or more IMS connections and/or one or more data network (e.g., Internet) connections) to the Wi-Fi communication link. The MSMS communication device may determine whether all of the one or more packet data network connections have been transferred to the Wi-Fi communication link. In response to determining that all of the one or more PDN connections of the first subscription are transferred to the Wi-Fi communication link, the MSMS communication device may enter a multi-active mode that enables the MSMS communication device to conduct multi-active communications using two or more subscriptions. In some examples, the MSMS communication device may change an operating mode of one or more protocol stacks of the MSMS communication device to enable and enter the multi-active mode. In some examples, the MSMS communication device may dynamically change a mode configuration of the one or more protocol stacks from dual-standby mode of operation to a dual-active mode of operation.

When the MSMS communication device is in the multi-active mode, the MSMS communication device may conduct a first communication session over the first subscription network using the Wi-Fi communication link, and may conduct the second communication session over a second subscription network using a cellular communication link.

When the MSMS communication device is in the multi-active mode, the MSMS communication device may conduct two concurrent communication sessions over the Wi-Fi communication link (e.g., two Voice-over-Wi-Fi communication sessions). In such examples, the MSMS communication device may register two or more Internet protocol multimedia subsystem (IMS) sessions, each related to a different subscription, to a different respective communication network. The MSMS communication device may place one or more non-Wi-Fi components (e.g., a cellular modem, RF resource, or another component) into a low-power mode. In some examples in which the MSMS communication device conducts two (or more) concurrent communications over the Wi-Fi communication link, one communication session may be connected to a trusted mode of communication (e.g., if a trusted mode of communication is required), and a second communication session may be connected to an un-trusted mode of communication.

After establishing the communication link with the Wi-Fi access point, the MSMS communication device may place one or more layers of a protocol stack in a low power mode. In some examples, the MSMS communication device may maintain the one or more layers of the protocol stack in the low power mode as long as the Wi-Fi communication link meets the threshold signal level. In some examples, when the one or more layers of the protocol stack are in the low power mode, the MSMS communication device may block a subscription associated with the protocol stack from accessing the RF resource of the MSMS communication device. In some examples, while the Wi-Fi signal meets the threshold signal level, the MSMS communication device may assign a higher priority to the second subscription for cellular communication purposes. For example, the MSMS communication device may arbitrate requests by each subscription to use the shared RF resource. In some examples, a transceiver module of the MSMS communication device may be configured to perform this operation.

In response to determining that the Wi-Fi communication link does not meet the threshold signal level (e.g., if the Wi-Fi communication link drops below the threshold signal level), the MSMS communication device may reactivate the one or more lower layers of the subscription that were placed into the low power mode, and the MSMS communication device may resume communications via a cellular communication network.

Figure 2:
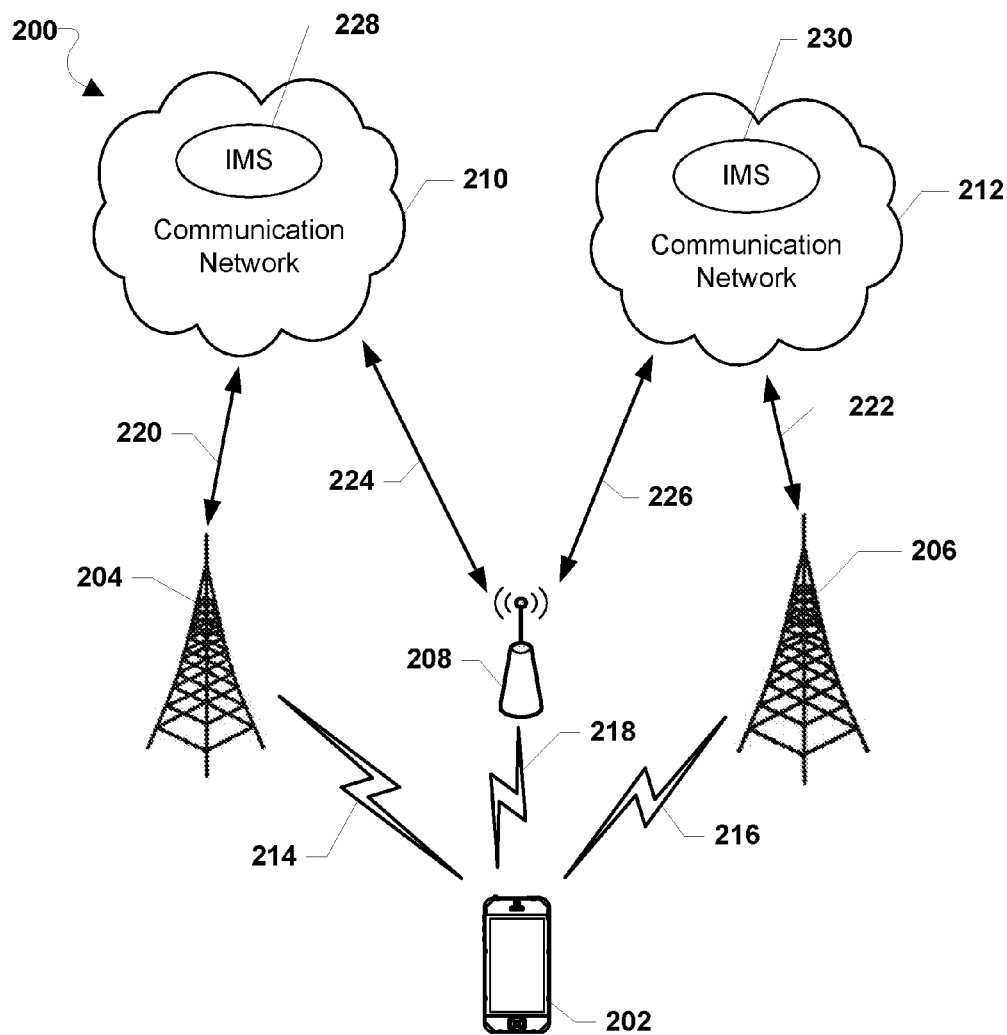
FIG. 2 is a component block diagram of a communication system suitable for use with various examples.

The methods of various examples may be implemented in multi-subscription multi-standby communication devices that operate within a variety of communication systems, particularly systems that include two or more communication networks. FIG. 2 illustrates a communication system 200 suitable for use with various examples.

An MSMS communication device 202 may communicate with a first communication network 210, which may include a plurality of base stations such as base station 204, and may communicate with a second communication network 212, which may include a plurality of base stations such as base station 206. The MSMS communication device 202 may also communicate with the first communication network 210 and the second communication network 212 via an access point 208. The base station 204 may communicate with the communication network 210 over a wired or wireless communication link 220, and the base station 206 may communicate with the communication network 212 over a wired or wireless communication link 222. The communication links 220 and 222 may include fiber optic backhaul links, microwave backhaul links, and other similar communication links. The access point 208 may communicate with the first communication network 210 over a wired or wireless communication link 224, and with the second communication network 212 over a wired or wireless communication link 226. The communication links 224 and 226 may be similar to the communication links 220 and 222. In some examples, each communication network 210 and 212 may include a mobile telephony communication network.

Each communication network 210 and 212 may also include an Internet Protocol multimedia subsystem (IMS) 228 and 230. The IMS 228 and 230 may perform communication operations that enable voice and/or data communication over the communication networks 210 and 212. For example, the MSMS communication device 202 may establish one or more packet data network (PDN) connections with an IMS 228 and/or 230 via a core network (e.g., an Evolved Packet Core, or EPC) of the communication network 210 and 212. The one or more packet data network connections may include connections to send and/or receive information related to authentication of the MSMS communication device 200 with a communication network, registration of the MSMS communication device 200 with an IMS, transmission of control data related to the establishment, maintenance, termination of one or more communication sessions of the MSMS communication device 202, and other information. Such messaging may include messages to and/or from one or more Call Session Control Function (CSCF) elements of an IMS. The CSCF element(s) are central in Session Initiation Protocol (SIP) signaling between the IMS and the MSMS communication device 202. Functions of the CSCF may include registering the MSMS communication device 202 with the IMS and service session management. The PDN connections may include one or more bearer channels between the MSMS communication device 202 and the IMS 228, 230 (and/or a core network of a communication network 210, 212). A bearer channel establishes a "virtual" connection between two endpoints so that data traffic can be sent between them, and thus acts as communication pipeline between two endpoints. In some implementations of the various examples, either or both of communication networks 210 and 212 may include an IMS. In some implementations of the various examples, one of the communication networks 210 and 212 may include an IMS (e.g., a Long Term Evolution (LTE) communication network), and the other of the communication networks 210 and 212 may not include an IMS (e.g., a Code Division Multiple Access (CDMA), Wideband CDMA (WCDMA), or Global System for Mobility (GSM) communication network).

The MSMS communication device 202 may communicate with the base station 204 over a wireless communication link 214, with the base station 206 over a wireless communication link 216, and with the access point 208 over a wireless communication link 218. Each of the communication networks 210 and 212 may support communications using one or more radio access technologies (RATs), and each of the wireless communication links 214 and 216 may include cellular connections that may be made through two-way wireless communication links using one or more RATs. Examples of cellular RATs may include LTE, GSM, Worldwide Interoperability for Microwave Access (Wi-MAX), CDMA, WCDMA, Time Division Multiple Access (TDMA), 1×RTT, Evolution-Data Optimized (EV-DO), and other RATs. The wireless communication link 218 may use a short range wireless RAT, such as one or more RATs in the Institute of Electrical And Electronics Engineers (IEEE) 802 family of protocols, including, for example, Wi-Fi, as well as one or more cellular RATs. While the communication links 214, 216, and 218 are illustrated as single links, each of the communication links 214, 216, and 218 may include a plurality of frequencies or frequency bands, each of which may include a plurality of logical channels. Additionally, each of the communication links 214, 216, and 218 may utilize more than one RAT.

Figure 3A:
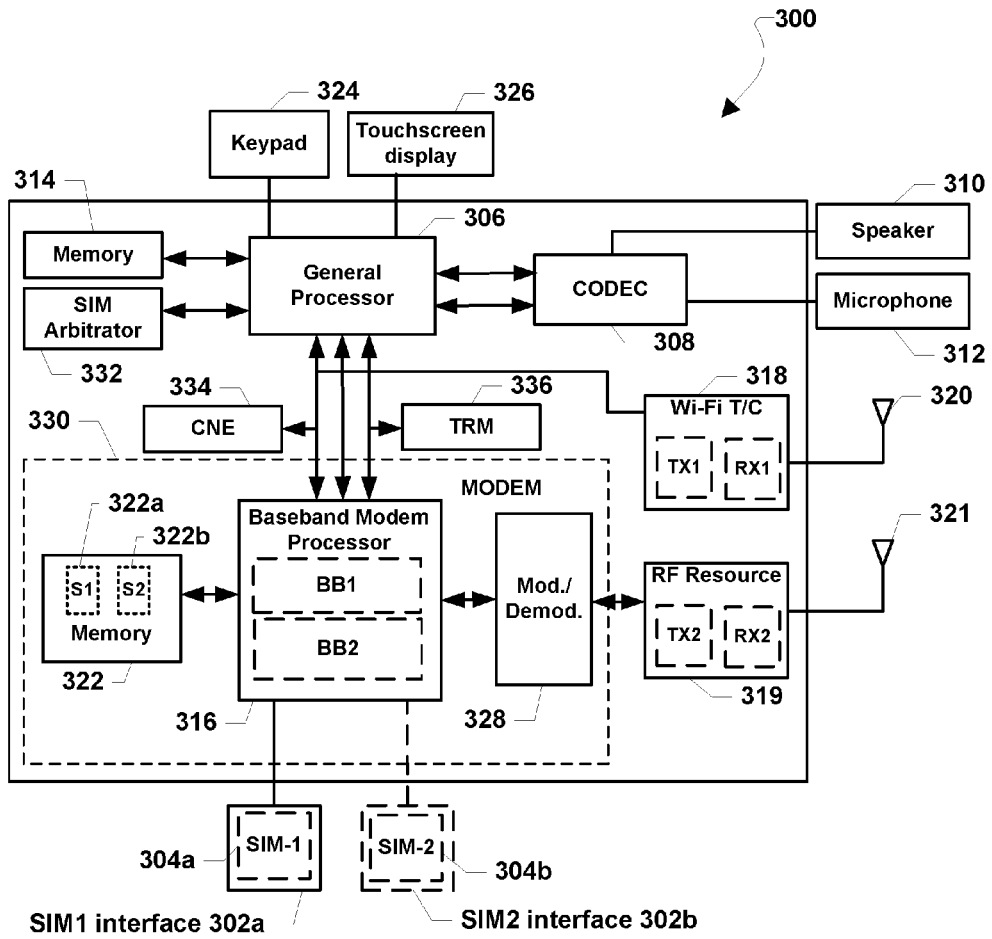
FIG. 3A is a component block diagram of a multi-subscription multi-standby communication device according to various examples.

FIG. 3A is a component block diagram of a multi-subscription multi-standby communication device 300 suitable for implementing various examples. With reference to FIGS. 2 and 3A, in various examples, the MSMS communication device 300 may be similar to the multi-subscription multi-standby communication device 202. The MSMS communication device 300 may include a first SIM interface 302a, which may receive a first identity module SIM-1 304a that may be associated with a first subscription. The MSMS communication device 300 may optionally also include a second SIM interface 302b, which may receive a second identity module SIM-2 304b that may be associated with a second subscription.

A SIM in various examples may be a Universal Integrated Circuit Card (UICC) that is configured with SIM and/or USIM (Universal Subscriber Identity Module) applications, enabling access to, for example, GSM and/or Universal Mobile Telecommunications System (UMTS) networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM and I/O circuits. A SIM used in various examples may contain user account information, an international mobile subscriber identity (IMSI), a set of SIM application toolkit (SAT) commands and storage space for phone book contacts. A SIM card may further store a Home-Public-Land-Mobile-Network (HPLMN) code to indicate the SIM card network operator provider. An Integrated Circuit Card Identity (ICCID) SIM serial number may be printed on the SIM card for identification.

The MSMS communication device 300 may include at least one controller, such as a general-purpose processor 306, which may be coupled to a coder/decoder (CODEC) 308. The CODEC 308 may in turn be coupled to a speaker 310 and a microphone 312. The general-purpose processor 306 may also be coupled to at least one memory 314. The memory 314 may be a non-transitory computer-readable storage medium that stores processor-executable instructions. The memory 314 may store an operating system (OS), as well as user application software and executable instructions. The memory 314 may also store application data, such as an array data structure.

The general-purpose processor 306 may be coupled to a modem 330. The modem 330 may include at least one baseband modem processor 316, which may be coupled to a memory 322 and a modulator/demodulator 328. The baseband modem processor 316 may include physically or logically separate baseband modem processors (e.g., BB1, BB2). The modulator/demodulator 328 may receive data from the baseband modem processor 316 and may modulate a carrier signal with encoded data and provide the modulated signal to an RF resource 319 for transmission. The modulator/demodulator 328 may also extract an information-bearing signal from a modulated carrier wave received from the RF resource 319, and may provide the demodulated signal to the baseband modem processor 316. The modulator/demodulator 328 may be or include a digital signal processor (DSP).

The baseband modem processor 316 may read and write information to and from the memory 322. The memory 322 may also store instructions associated with a protocol stack, such as protocol stack S1 322a and protocol stack S2 322b. The protocol stacks S1 322a, S2 322b generally include computer executable instructions to enable communication using a radio access protocol or communication protocol. Each protocol stack S1 322a, S2 322b typically includes network protocol layers structured hierarchically to provide networking capabilities. The modem 330 may include one or more of the protocol stacks S1 322a, S2 322b to enable communication using one or more RATs. The protocol stacks S1 322a, S2 322b may be associated with a SIM card (e.g., SIM-1 304a, SIM-2 304b) configured with a subscription. For example, the protocol stack S1 322a and the protocol stack S2 322b may be associated with the SIM-1 304a. The illustration of only two protocol stacks S1 322a, S2 322b is not intended as a limitation, and the memory 322 may store more than two protocol stacks (not illustrated).

Each SIM and/or RAT in the MSMS communication device 300 (e.g., SIM-1 304a, SIM-2 304b) may be coupled to the modem 330 and may be associated with or permitted to use an RF resource. The term "RF resource" may be used to refer to all of the circuitry used to send and/or receive RF signals, which may include the baseband modem processor 316 that performs baseband/modem functions for communicating with/controlling a RAT, one or more radio units including transmitter and receiver components that are shown as RF resource 319, one or more of the wireless antenna 321, and additional circuitry that may include one or more amplifiers and radios. In some examples, an RF resource may share a common baseband modem processor 316 (i.e., a single device that performs baseband/modem functions for all RATs on the MSMS communication device). In some examples, each RF resource may include the physically or logically separate baseband processors (e.g., BB1, BB2).

The RF resource 319 may include transceivers associated with one or more RATs and may perform transmit/receive functions for the MSMS communication device on behalf of their respective RATs. The RF resource 319 may include separate transmit and receive circuitry. The RF resource 319 may be coupled to a wireless antenna (e.g., the wireless antenna 321). The RF resource 319 may also be coupled to the modem 330 (e.g., via the modulator/demodulator 328, the baseband modem processor 316, or another component).

The MSMS communication device 300 may include a Wi-Fi transceiver 318. The Wi-Fi transceiver 318 may include circuits and/or other components including a transceiver circuitry, receiver circuitry, a Wi-Fi modem, and other components that enable the Wi-Fi transceiver to send and receive a signal encoded with data. The Wi-Fi transceiver 318 may receive data from the general processor 306 and may modulate a carrier signal with encoded data and transmit the modulated signal via an antenna 320. The Wi-Fi transceiver 318 may also extract an information-bearing signal from a modulated carrier wave received via the antenna 320, and may provide the demodulated signal to the general processor 306. The Wi-Fi transceiver 318 may also be coupled the connectivity engine 334, the transceiver resource manager 336, and the modem 330 (e.g., via the baseband modem processor 316 or another component).

In some examples, the general-purpose processor 306, memory 314, baseband processor(s) 316, a Wi-Fi transceiver 318, and the RF resource 319 may be included in the multi-subscription multi-standby communication device 300 as a system-on-chip. In some examples, the first and second SIMs 304a, 304b and their corresponding interfaces 302a, 302b may be external to the system-on-chip. Further, various input and output devices may be coupled to components on the system-on-chip, such as interfaces or controllers. Example user input components suitable for use in the multi-subscription multi-standby communication device 300 may include, but are not limited to, a keypad 324 and a touchscreen display 326.

In some examples, the keypad 324, the touchscreen display 326, the microphone 312, or a combination thereof may perform the function of receiving the request to initiate an outgoing call. For example, the touchscreen display 326 may receive a selection of a contact from a contact list or receive a telephone number. In another example, either or both of the touchscreen display 326 and microphone 312 may perform the function of receiving a request to initiate an outgoing call. For example, the touchscreen display 326 may receive a user selection of a contact from a contact list or receive a telephone number. As another example, the request to initiate the outgoing call may be in the form of a voice command received via the microphone 312. Interfaces may be provided between the various software modules and functions in the MSMS communication device 300 to enable communication between them.

Functioning together, the two SIMs 304a, 304b, the baseband processor(s) 316, the RF resource 319, the Wi-Fi transceiver 318, and the antennas 320, 321 may enable communications on two or more RATs. For example, one SIM, baseband processor, and the RF resource 319 and/or the Wi-Fi transceiver 318 may be configured to support two different RATs. In some examples, more RATs may be supported on the MSMS communication device 300 by adding more SIM cards, SIM interfaces, RF resources, and antennas for connecting to additional mobile networks.

The MSMS communication device 300 may also include a SIM arbitrator unit 332 configured to manage the respective access of subscriptions associated with the first and second SIMs 304a, 304b to the RF resource 319 and the Wi-Fi transceiver 318. The SIM arbitrator 332 may be in connection with a processor, such as the general processor 306. In some examples, the SIM arbitration unit 332 may perform periodic signal strength measurements to determine whether a Wi-Fi communication link (e.g., received via the Wi-Fi transceiver 318) meets a threshold signal level, and further may direct that one or more packet data network connections related to a subscription of the MSMS communication device 300 be transferred to the Wi-Fi communication link.

The MSMS communication device 300 may also include a connectivity engine (CNE) 334. The connectivity engine 334 may be in communication with a processor, such as the general processor 306 and/or the baseband processor 316. The connectivity engine 334 may estimate a signal level as well as other signal characteristics (e.g., available bandwidth, achievable throughput, and other characteristics). In some examples, the connectivity engine 334 may provide signal level and/or other information to the SIM arbitrator unit 332. In some examples, the connectivity engine 334 may be included in the modem 330.

The MSMS communication device 300 may also include a transceiver resource manager (TRM) 336. The transceiver resource manager 336 may be in communication with a processor, such as the general processor 306 and/or the baseband processor 316. In some examples, the transceiver resource manager 336 may be included in the modem 330. In some examples, the transceiver resource manager 336 may communicate with the Wi-Fi transceiver 318 and/or the RF resource 319 either directly or via an intermediate component, such as the modem 330. In some examples, the transceiver resource manager 336 may arbitrate access to one or more of the RF resource 319 by one or more subscriptions of the MSMS communication device 300. In some examples, the transceiver resource manager 336 may assign an arbitration priority to one or more subscriptions of the MSMS communication device 300.

Figure 3B:
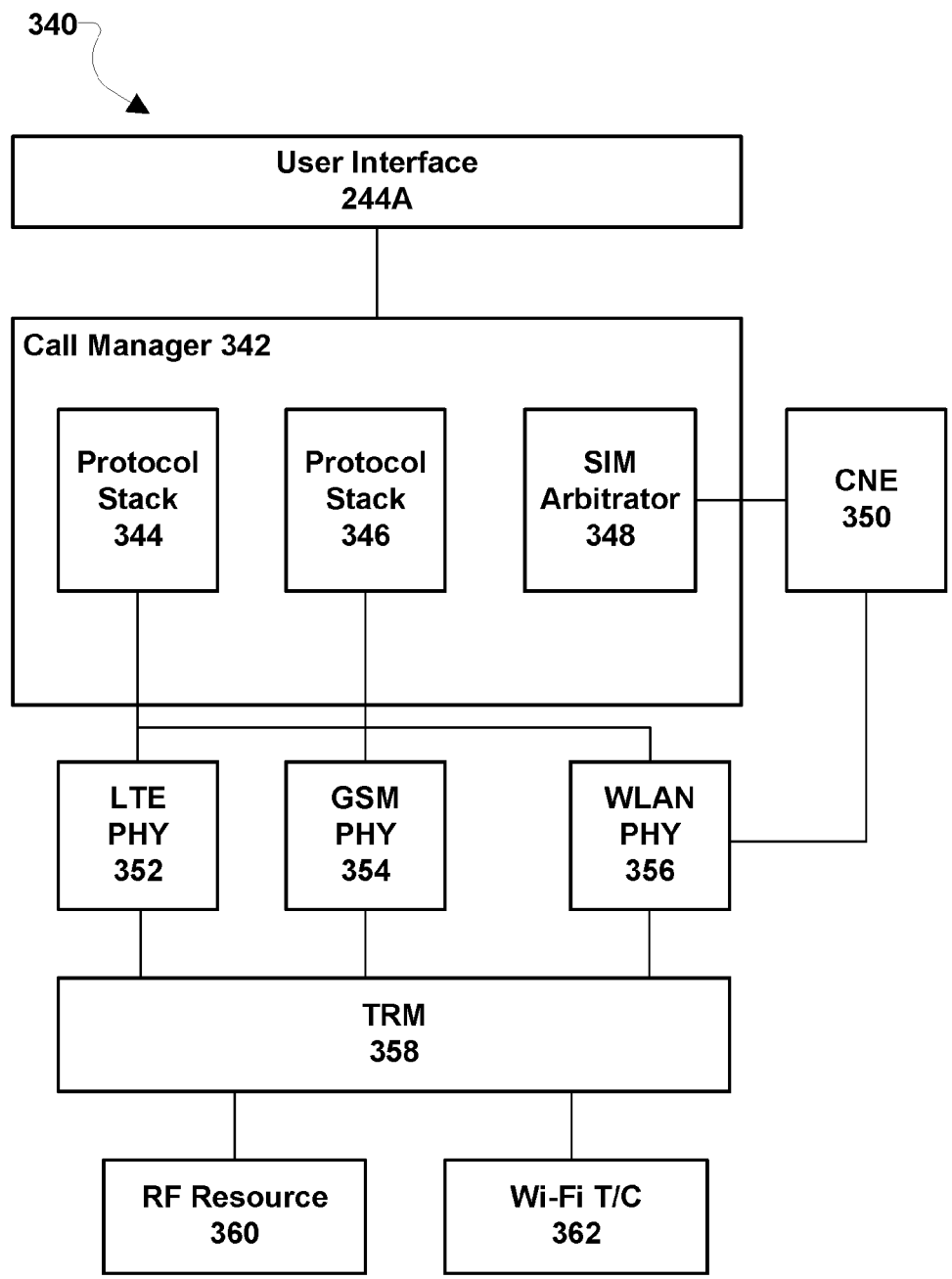
FIG. 3B is a component block diagram illustrating a multi-subscription multi-standby communication device according to various examples.

FIG. 3B is a component block diagram of a multi-subscription multi-standby communication device 340 suitable for implementing various examples. With reference to FIGS. 2-3B, in various examples, the MSMS communication device 340 may be similar to the multi-subscription multi-standby communication device 202, 300. In the example MSMS communication device 340 illustrated in FIG. 3B, a first subscription is LTE and a second subscription is GSM.

The MSMS communication device 340 may include a call manager 342, which may include or be in communication with first and second protocol stacks 344 and 346, and a SIM arbitrator unit 348. The SIM arbitrator unit 348 may be configured to manage the respective access of subscriptions associated with two or more SIMs (e.g., the first and second SIMs 304a, 304b) to an RF resource 362 and a Wi-Fi transceiver 362. The SIM arbitrator 348 may perform periodic signal strength measurements based on a signal received from a connectivity engine (CNE) 350 to determine whether a Wi-Fi communication link meets a threshold signal level, and further may direct that one or more packet data network connections related to a subscription of the MSMS communication device 340 be transferred to the Wi-Fi communication link. The connectivity engine 350 may estimate a signal level as well as other signal characteristics (e.g., available bandwidth, achievable throughput, and other characteristics), and may provide signal level and/or other information to the SIM arbitrator unit 348.

The MSMS communication device 340 may also include a transceiver resource manager (TRM) 358. The transceiver resource manager 358 may communicate with the Wi-Fi transceiver 362 and/or the RF resource 360 either directly or via an intermediate component (e.g., the modem 330). In some examples, the transceiver resource manager 358 may arbitrate access to the RF resource 360 by one or more subscriptions of the MSMS communication device 340. In some examples, the transceiver resource manager 358 may assign an arbitration priority to one or more subscriptions of the MSMS communication device 340.

Figure 4:
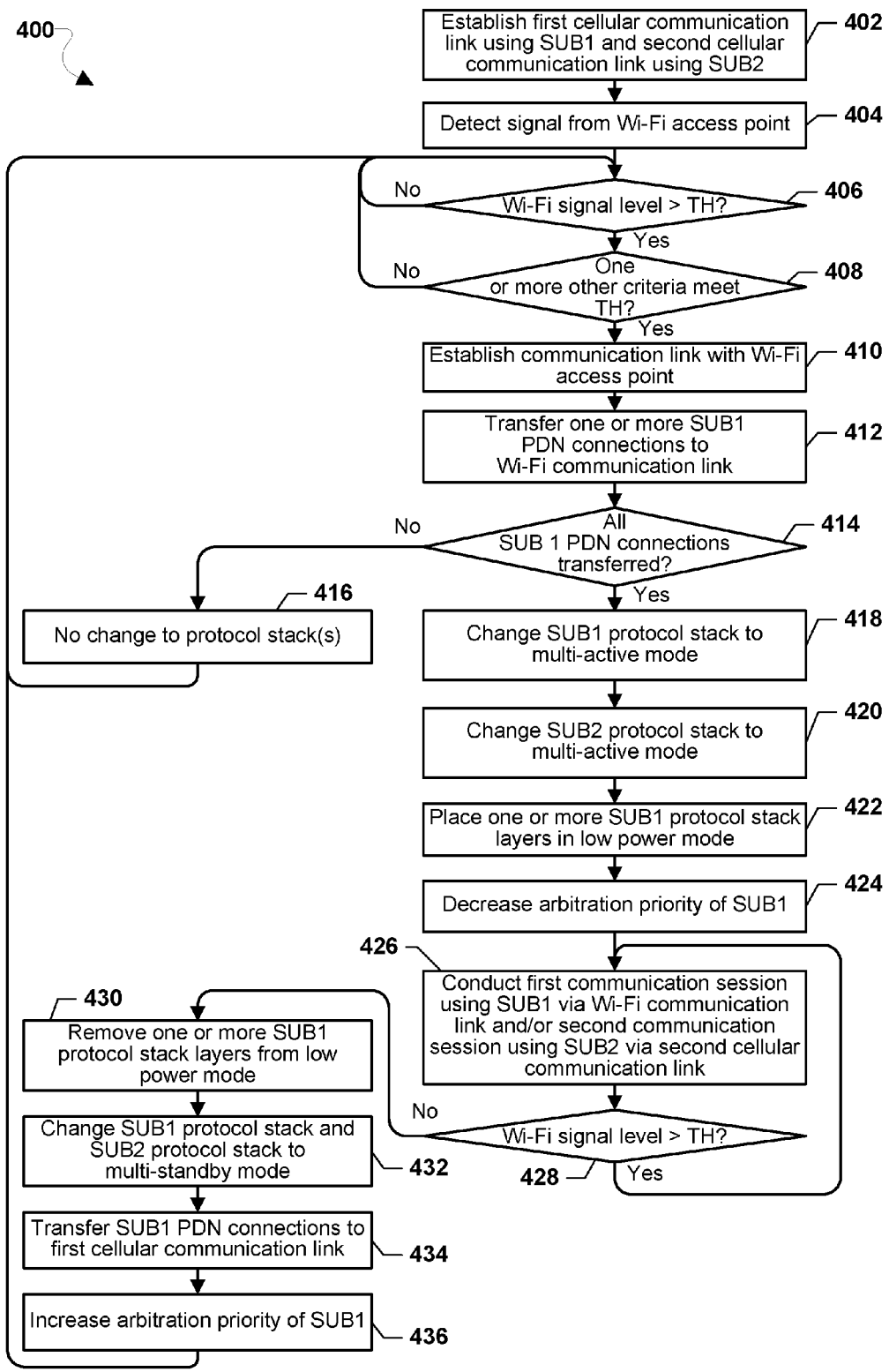
FIG. 4 is a process flow diagram illustrating a method for managing multi-active communication in a multi-subscription multi-standby communication device according to various examples.

FIG. 4 illustrates an example method 400 for managing multi-active communication on an MSMS communication device. With reference to FIGS. 2-4, the method 400 may be implemented by an MSMS communication device (e.g., the MSMS communication device 200, 300, 340), such as under the control of a processor (e.g., the general-purpose processor 306, the baseband processor 316, a separate controller, and/or the like) of the MSMS communication device (i.e., a "device processor").

In block 402, the device processor may establish a first cellular communication link using a first subscription (e.g., SUB1) and a second cellular communication link using a second subscription (e.g., SUB2). For example, a connectivity engine of the MSMS communication device (e.g., the connectivity engine 334, 350) may establish and manage the first and second cellular communication links. In some examples, establishing the first or second cellular communication link may include establishing one or more PDN connections with an IMS (e.g., the IMS 228, 230). The one or more packet data network connections may include connections to send and/or receive information related to authentication of the MSMS communication device with a communication network, registration of the MSMS communication device with an IMS, transmission of control data related to the establishment, maintenance, termination of one or more communication sessions of the MSMS communication device 202, and other information.

In block 404, the device processor may receive an indication from a Wi-Fi transceiver (e.g., the Wi-Fi transceiver 318, 326) that a signal from a Wi-Fi access point is detected. In some examples, a connectivity engine of the MSMS communication device (e.g., the connectivity engine 334, 350) may detect the signal from the Wi-Fi access point.

In determination block 406, the device processor may determine whether a signal level of the signal received by the Wi-Fi transceiver from the Wi-Fi access point meets a threshold signal level. A Wi-Fi signal level that meets the threshold signal level may include a Wi-Fi signal level at or above the threshold signal level.

In response to determining that the Wi-Fi signal level does not meet the threshold signal level (i.e., determination block 406="No"), the device processor may periodically monitor the signal level of the signal received by the Wi-Fi transceiver from the Wi-Fi access point to determine whether the Wi-Fi signal level meets the threshold signal level.

In response to determining that the Wi-Fi signal level meets the threshold signal level (i.e., determination block 406="Yes"), the device processor may determine whether one or more other criteria meet a respective threshold in determination block 408. For example, the device processor may determine whether a load or utilization of the Wi-Fi access point meets (e.g., is at or below) a utilization threshold. As another example, the device processor may determine whether an available data throughput or available data capacity of the Wi-Fi access point meets (e.g., is equal to or above) a data throughput threshold. In response to determining that the one or more other criteria do not meet the respective threshold (i.e., determination block 408="No"), the device processor may periodically monitor the signal level of the Wi-Fi access point to determine whether the Wi-Fi signal level meets the threshold signal level in determination block 406.

In response to determining that the one or more other criteria meet the respective threshold (i.e., determination block 408="Yes"), the device processor may cause the Wi-Fi transceiver to establish a communication link with the Wi-Fi access point in block 410.

In block 412, the device processor may transfer one or more PDN connections of the first subscription to the Wi-Fi communication link in block 308. In some examples, the device processor may transfer all mandatory PDN connections (which may include one or more IMS connections) to the Wi-Fi communication link.

In determination block 414, the device processor may determine whether all PDN connections of the first subscription are transferred to the Wi-Fi communication link.

In response to determining that all of the PDN connections of the first subscription are not transferred to the Wi-Fi communication link (i.e., determination block 414="No"), the device processor may make no change to any protocol stack (e.g., of the first subscription or the second subscription) in block 416. The device processor may periodically monitor the signal level of the Wi-Fi access point in determination block 406.

In response to determining that all of the PDN connections of the first subscription are transferred to the Wi-Fi communication link (i.e., determination block 410="Yes"), the device processor may change the protocol stack of the first subscription to a multi-active mode in block 418, and change the protocol stack of the second subscription to a multi-active mode in block 420. In the multi-active mode, the protocol stacks of the first subscription and the second subscription may be configured to establish and conduct two or more concurrent communication sessions, with one communication session using the shared cellular RF resource and the other communication session using the Wi-Fi transceiver in a Voice-over-Wi-Fi operating mode. In some examples, the device processor may dynamically change a mode configuration of the one or more protocol stacks from dual-standby mode of operation to a dual-active mode of operation. In some examples, the device processor may bring both the first protocol stack and/or the second protocol stack to an active state, should either protocol stack be in a low power or idle state.

For example, in a conventional LTE+G/1× communication device implementation, when the communication device conducts an active call using WFC using a first subscription (e.g., over a first communication network), the communication device may monitor a 1×/G paging message on the second subscription, but the communication device may not setup an active communication session on the second subscription, nor determine an identity of a caller associated with the paging message. Thus, the communication device may miss a call.

As another example, when a conventional LTE+G/1× communication device conducts a voice call using 1×/G using a second subscription (e.g., over a second communication network), the communication device may not be designed to set up a call over the first subscription (e.g., if the call uses WFC), assuming that the communication device's RF chains are dedicated for use by the a voice call on the second subscription (such as in a conventional DSDS device design). In this scenario as well, the communication device may miss a call.

Changing the protocol stack of the first subscription to the multi-active mode in block 418, and change changing the protocol stack of the second subscription to the multi-active mode in block 420 may enable the communication device to monitor paging messages and to determine a calling party identity, as well display the calling party identity on a user interface.

In block 422, the device processor may place one or more protocol stack layers of the first subscription protocol stack in a low power mode. In some examples, the device processor may block or prevent one or more layers of the first subscription protocol stack from accessing an RF resource of the MSMS communication device. Blocking access to the RF resource enables the device processor to maintain the one or more layers of the first subscription protocol stack in the low power mode, as well as prevent the one or more layers of the first subscription protocol stack from communicating over a cellular communication link (e.g., the first cellular communication link and/or the second cellular communication link).

In block 424, the device processor may decrease an arbitration priority of the first subscription. For example, while the Wi-Fi signal level meets the signal level threshold, the device processor may decrease the priority of the first subscription for cellular communication purposes. Additionally or alternatively, the device processor may increase the priority of the second subscription for cellular communication purposes. The device processor may use the priority of the first subscription and/or the second subscription to arbitrate requests by the first subscription and/or the second subscription for use of the RF resource of the MSMS communication device. In some examples, a transceiver resource manager (e.g., the transceiver resource manager 336, 358) may be configured to arbitrate requests for use of the RF resource, either independently or at the direction of the device processor.

In block 426, the device processor may conduct a first communication session using the first subscription via the Wi-Fi communication link, and/or may conduct a second communication session using the second subscription via the second cellular communication link.

In determination block 428, the device processor may determine whether a signal level of the Wi-Fi communication link meets the threshold signal level. For example, the device processor may periodically monitor the signal level of the Wi-Fi communication link while the device processor conducts the first communication session via the Wi-Fi communication link. For example, the device processor may periodically determine whether the signal level of the Wi-Fi communication link meets the threshold signal level.

In response to determining that the signal level of the Wi-Fi communication link does meet the threshold signal level (i.e., determination block 428="Yes"), the device processor may continue to conduct the first communication session using the first subscription via the Wi-Fi communication link in block 426.

In response to determining that the signal level of the Wi-Fi communication link no longer meets the threshold signal level (i.e., determination block 428="No"), the device processor may remove the one or more protocol stack layers of the first subscription from the low power mode in block 430.

In block 432, the device processor may change the protocol stack of the first subscription and the protocol stack of the second subscription to a multi-standby mode. In the multi-standby mode, the protocol stacks of the first subscription and the second subscription may be configured to establish and/or conduct a communication session on one of the first subscription and the second subscription, and the device processor may arbitrate between the first subscription and the second subscription for access the RF resource of the MSMS communication device.

In block 434, the device processor may transfer the PDN connections of the first subscription to the first cellular communication link. When the PDN connections of the first subscription are transferred to the first cellular communication link, the device processor may conduct subsequent communication sessions using the first subscription over the first cellular communication link.

In block 436, the device processor may increase the arbitration priority of the first subscription. Additionally or alternatively, the device processor may decrease the arbitration priority of the second subscription.

The device processor may return to periodically monitoring the signal level of the Wi-Fi access point in determination block 406.

Figure 5A:
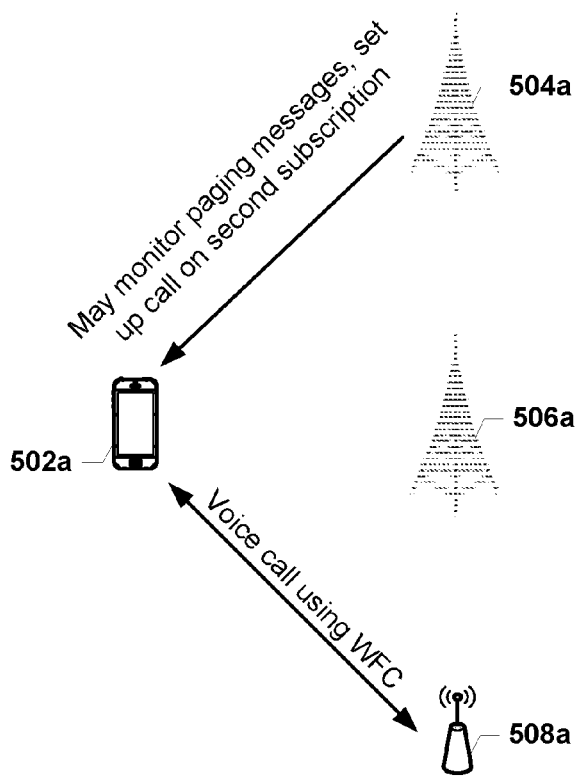
FIGS. 5A and 5B are component block diagrams of communication systems suitable for use with various examples.

FIG. 5A is a component block diagram of a communication system suitable for use with various examples. In response to determining that all of the one or more PDN connections of a first subscription are transferred to a Wi-Fi communication link, an MSMS communication device 502a may enter a multi-active mode that enables the MSMS communication device to conduct multi-active communications using two or more subscriptions. In some examples, the MSMS communication device may change an operating mode of one or more protocol stacks of the MSMS communication device to enable and enter the multi-active mode. In some examples, the MSMS communication device may dynamically change a mode configuration of the one or more protocol stacks from dual-standby mode of operation to a dual-active mode of operation.

When the MSMS communication device changes the operating mode of the one or more protocol stacks to multi-active mode, the MSMS communication device may conduct a first communication session over the first subscription network using a Wi-Fi communication link (e.g., via access point 508a), and may conduct the second communication session over a second subscription network using a cellular communication link (e.g., via base station 504a). In various examples, the MSMS communication device may prevent or block the first subscription from using a cellular modem and/or RF resource chain, and the MSMS communication device may direct the first subscription to use a Wi-Fi transceiver. In such examples, the MSMS communication device may enable the second subscription to use the RF resource chain without sharing the RF resource chain with the first subscription. In some examples, a protocol stack of the second subscription may be a GERAN (GSM Enhanced Data Rates for GSM Evolution) or Universal Mobile Telecommunications System (UMTS).

For example, the MSMS communication device 502a may conduct an active voice call using WFC using a first subscription on a first communication network (e.g., via access point 508a), and the MSMS communication device 502a may monitor 1x/G paging messages on a second subscription (e.g., via base station 504a), and may set up a call on the second subscription as well as determine the caller's identity.

Figure 5B:
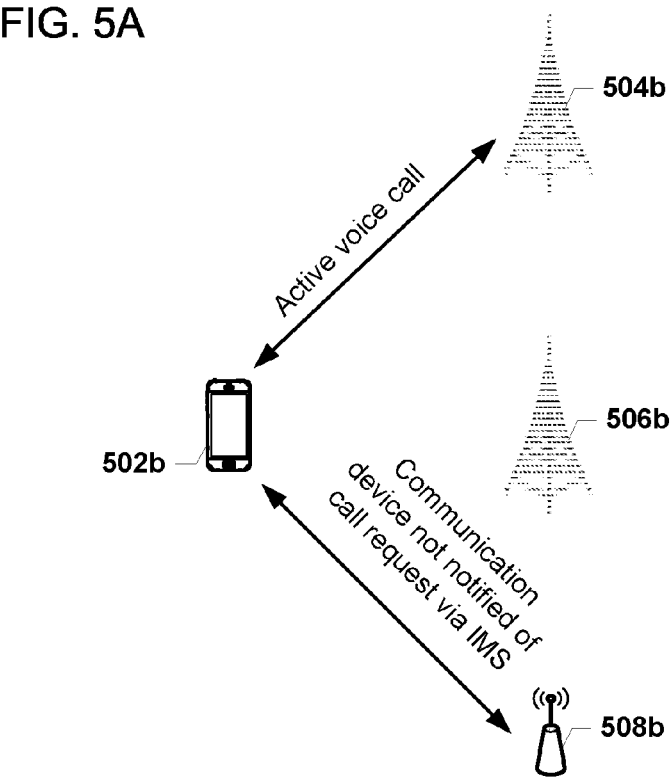

As another example, with reference to FIG. 5B, when a communication device (e.g., communication device 502b) conducts a voice call using 1x/G on a second subscription (e.g., via base station 504b), the communication device 502b may set up a call over the first subscription, for example, if the call uses WFC (e.g., via access point 508b).

Figure 6:
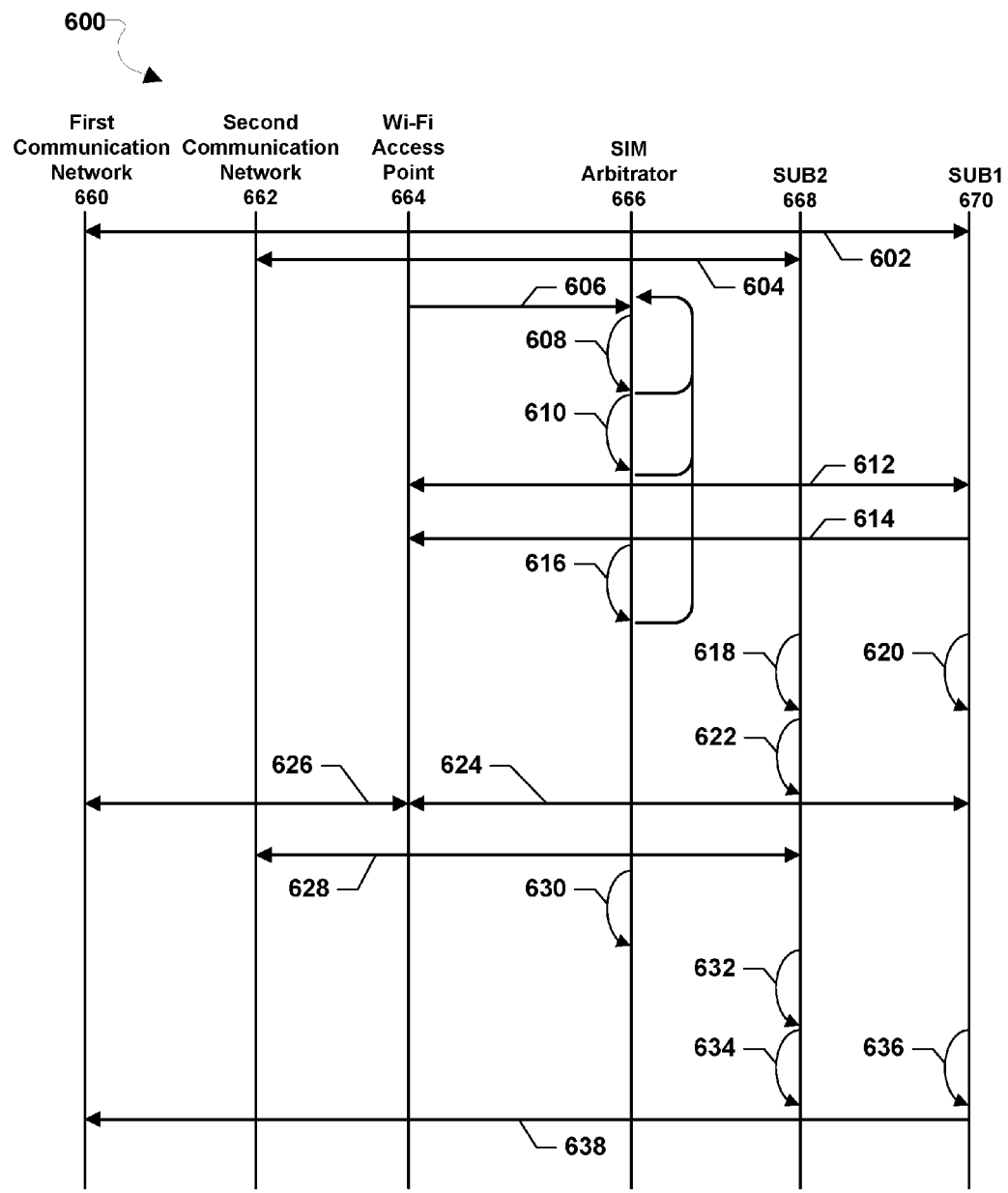
FIG. 6 is a message flow diagram illustrating a method for managing multi-active communication in a multi-subscription multi-standby communication device according to various examples.

FIG. 6 is a message flow diagram illustrating an example method 600 for managing multi-active communication on an MSMS communication device. With reference to FIGS. 2-6, the method 600 may be implemented by an MSMS communication device (e.g., the MSMS communication device 202, 300, 340), such as under the control of a processor (e.g., the general-purpose processor 306, the baseband processor 316, a separate controller, and/or the like) of the MSMS communication device (i.e., a "device processor").

In operation 602, the device processor may establish a first cellular communication link using a first subscription 670 (e.g., SUB1) with a first communication network 660 (which may be similar to the communication network 210).

In operation 604, the device processor may establish a second cellular communication link using a second subscription 668 (e.g., SUB2) with a second communication network 662 (which may be similar to the communication network 212). For example, a connectivity engine of the MSMS communication device (e.g., the connectivity engine 334, 350) may establish and manage the first and second cellular communication links. In some examples, establishing the first or second cellular communication link may include establishing one or more PDN connections with an IMS (e.g., the IMS 228, 230).

The device processor may determine that the Wi-Fi transceiver detects a signal 606 from a Wi-Fi access point 664 (which may be similar to the Wi-Fi access point 208). In some examples, the connectivity engine of the MSMS communication device may determine that the Wi-Fi transceiver is receiving the signal from the Wi-Fi access point. In some examples, the connectivity engine may provide the Wi-Fi signal, or information about the Wi-Fi signal from the Wi-Fi transceiver, to a SIM arbitrator unit of the MSMS communication device (e.g., the SIM arbitration unit 332, 348).

The device processor may determine whether the Wi-Fi signal received by the Wi-Fi transceiver meets a signal level threshold in operation 608. In some examples, a SIM arbitrator unit (e.g., the SIM arbitrator unit 332, 348) may determine whether the Wi-Fi signal meets the signal level threshold. In response to determining that the Wi-Fi signal does not meet the signal level threshold, the device processor may continue to monitor the Wi-Fi signal received by the Wi-Fi transceiver to determine when the signal level of the Wi-Fi signal 606 meets the signal level threshold.

In response to determining that the Wi-Fi signal does meet the signal level threshold, the device processor may determine whether one or more other criteria meet a respective threshold in operation 610. For example, the device processor may determine whether a load or utilization of the Wi-Fi access point meets (e.g., is at or below) a utilization threshold, and/or whether an available data throughput or available data capacity of the Wi-Fi access point meets (e.g., is at or above) a data throughput threshold. In response to determining that the one or more other criteria do not meet the respective threshold, the device processor may continue to periodically monitor the signal level of the Wi-Fi access point to determine when the signal level of the Wi-Fi signal 606 meets the threshold signal level.

In response to determining that the one or more other criteria meet the respective threshold, the device processor may cause the Wi-Fi transceiver to establish a communication link 612 with the Wi-Fi access point 664.

In operation 614, the device processor may transfer one or more PDN connections of the first subscription to the Wi-Fi communication link 612.

In operation 616, the device processor may determine whether all PDN connections of the first subscription are transferred to the Wi-Fi communication link 612. In some examples, the SIM arbitrator 666 may determine whether all PDN connections of the first subscription are transferred to the Wi-Fi communication link 612. In response to determining that all PDN connections of the first subscription are not transferred to the Wi-Fi communication link, the device processor may periodically monitor the signal level of the Wi-Fi access point received by the Wi-Fi transceiver to determine whether the signal level of the Wi-Fi signal 606 meets the threshold signal level. In some examples, the device processor may make no change to any protocol stack (e.g., of the first or second subscription). In some examples, the device processor may decrease an arbitration priority of the first subscription, e.g., for cellular communication purposes.

In response to determining that all PDN connections of the first subscription are transferred to the Wi-Fi communication link, the device processor may change a protocol stack of the second subscription to multi-active mode in operation 618, and the device processor may change a protocol stack of the first subscription to multi-active mode in operation 620. In operation 622, the device processor may place one or more layers of the second subscription protocol stack into a low power mode.

The device processor may subsequently communicate with the first communication network 660 using the first subscription 670 via the Wi-Fi transceiver communicating with the Wi-Fi access point 664 (e.g., via voice-over-Wi-Fi). For example, the device processor may communicate via the Wi-Fi transceiver with the Wi-Fi access point 664 (communication 624), and via the Wi-Fi access point with the first communication network 660 (communication 626). The device processor may also communicate 628 with the second communication network 662 using the second subscription 668 via a cellular communication link supported by the shared RF resource.

In operation 630, the device processor may periodically monitor the signal level of the Wi-Fi communication link. As long as the signal level of the Wi-Fi communication link meets the signal level threshold, the device processor may communicate with the first communication network 660 using the first subscription 670 via the Wi-Fi access point 664.

In response to determining that the signal level of the Wi-Fi communication link does not meet the signal level threshold, the device processor may remove one or more protocol stack layers of the second subscription from the low power mode in operation 632.

In operation 634, the device processor may change the protocol stack of the second subscription to a multi-standby mode. In operation 636, the device processor may change the protocol stack of the first subscription to the multi-standby mode.

In operation 638, the device processor may transfer the PDN connections of the first subscription to a cellular communication link with the first communication network 660. Subsequently, the device processor may conduct communications with the first communication network 660 over the cellular communication link.

Figure 7:
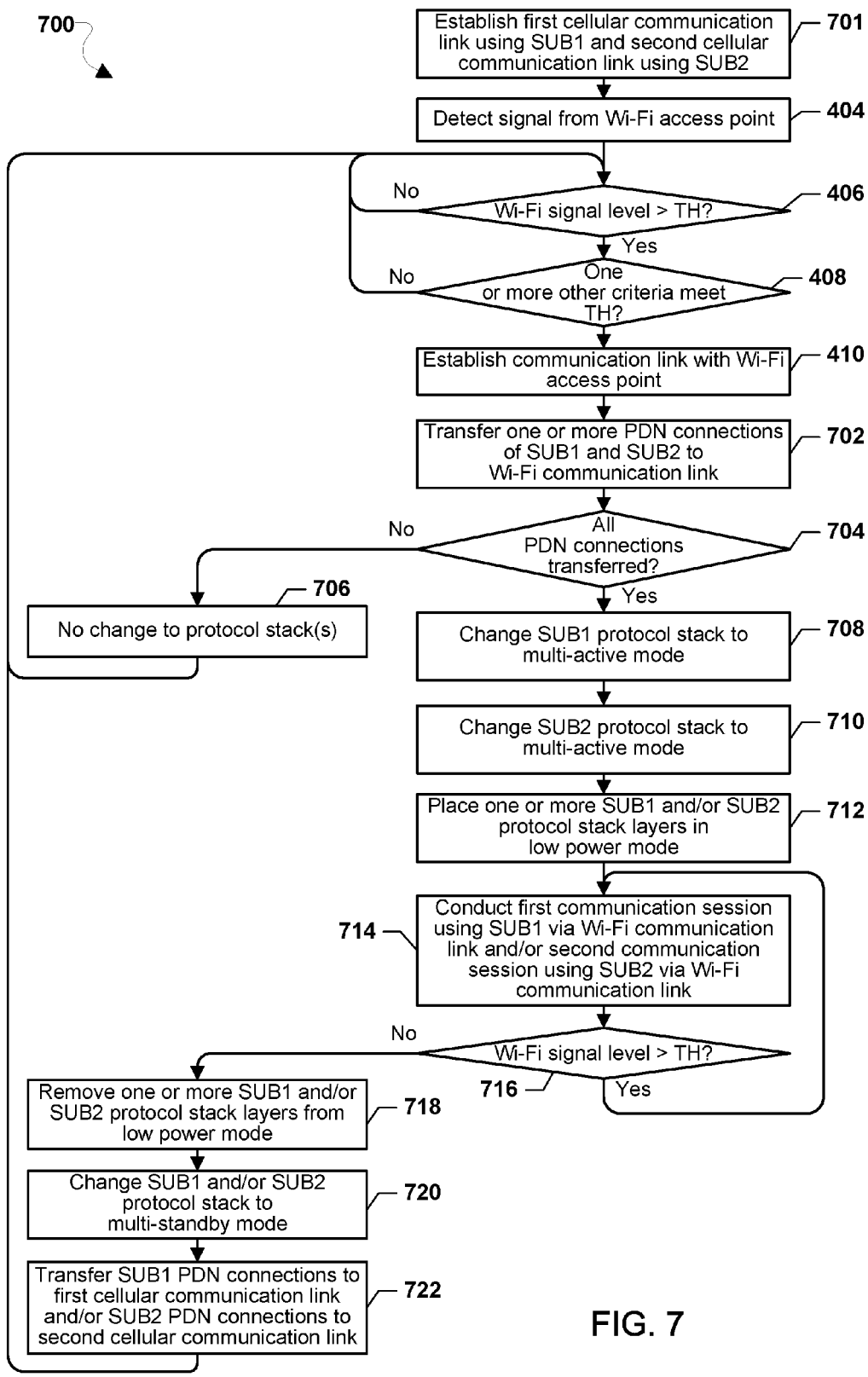
FIG. 7 is a process flow diagram illustrating a method for managing multi-active communication in a multi-subscription multi-standby communication device according to various examples.

FIG. 7 illustrates another example method 700 for managing multi-active communication on an MSMS communication device. With reference to FIGS. 2-7, the method 700 may be implemented by an MSMS communication device (e.g., the MSMS communication device 202, 300, 340), such as under the control of a processor (e.g., the general-purpose processor 306, the baseband processor 316, a separate controller, and/or the like) of the MSMS communication device (i.e., a "device processor").

In block 701, the device processor may establish a first cellular communication link using a first subscription (e.g., SUB1) and a second cellular communication link using a second subscription (e.g., SUB2). For example, a connectivity engine of the MSMS communication device (e.g., the connectivity engine 334, 350) may establish and manage the first and second cellular communication links. In some examples, establishing the first or second cellular communication link may include establishing one or more PDN connections with an IMS (e.g., the IMS 228, 230). The one or more packet data network connections may include connections to send and/or receive information related to authentication of the MSMS communication device with a communication network, registration of the MSMS communication device with an IMS, transmission of control data related to the establishment, maintenance, termination of one or more communication sessions of the MSMS communication device, and other information.

In some examples, the MSMS communication device may be configured such that the first subscription and the second subscription may use the same RAT (for example, an LTE+LTE (L+L)-configured MSMS communication device). In such examples, only the first or second subscription may register with an IMS of a communication network (e.g., an IMS of a first communication network, or an IMS of the second communication network, respectively). In such examples, the MSMS communication device may use the first communication link and the second communication link in a multi-standby mode.

In blocks 404-410, the device processor may perform operations of like-numbered blocks of the method 400 as described with reference to FIG. 4. In block 702, the device processor may transfer one or more PDN connections of the first subscription (e.g., SUB1) and the second subscription (e.g., SUB2) to the Wi-Fi communication link. In some examples, the device processor may transfer all mandatory PDN connections (which may include one or more IMS connections and/or one or more data network (e.g., Internet) connections) to the Wi-Fi communication link.

In determination block 704, the device processor may determine whether all PDN connections of the first subscription and the second subscription are transferred to the Wi-Fi communication link. In response to determining that all of the PDN connections of the first subscription and the second subscription are not transferred to the Wi-Fi communication link (i.e., determination block 704="No"), the device processor may make no change to any protocol stack (e.g., of the first subscription or the second subscription) in block 706, and return to periodically monitoring the signal level of the Wi-Fi access point in determination block 306.

In response to determining that all of the PDN connections of the first subscription and the second subscription are transferred to the Wi-Fi communication link (i.e., determination block 704="Yes"), the device processor may change the protocol stack of the first subscription to a multi-active mode in block 708, and change the protocol stack of the second subscription to a multi-active mode in block 710. In the multi-active mode, the protocol stacks of the first subscription and the second subscription may be configured to establish and conduct two or more concurrent communication sessions using the Wi-Fi communication link to support one communication session and the shared RF resource to support the other communication session. In some examples, the device processor may dynamically change a mode configuration of the one or more protocol stacks from dual-standby mode of operation to a dual-active mode of operation. In some examples, the device processor may bring both the first protocol stack and/or the second protocol stack to an active state, should either protocol stack be in a low power or idle state. In some examples, the multi-active mode may enable the protocol stacks of the first subscription and the second subscription to register concurrently with an IMS of two or more communication networks.

In block 712, the device processor may place one or more protocol stack layers of the first subscription protocol stack and the second subscription protocol stack in a low power mode.

In block 714, the device processor may conduct a first communication session using the first subscription via the Wi-Fi communication link, and/or may conduct a second communication session using the second subscription via the Wi-Fi communication link. In some examples, the device processor may conduct one of the first or second communication sessions using a trusted mode of communication, and may conduct the other of the first or second communication sessions using an un-trusted mode of communication. In some examples, if no trusted mode of communication is required, the device processor may conduct both the first and the second communication sessions using an untrusted mode of communication.

In determination block 716, the device processor may determine whether the signal level of the Wi-Fi communication link meets the threshold signal level. For example, the device processor may periodically monitor the signal level of the Wi-Fi communication link while the device processor conducts the first and/or second communication session via the Wi-Fi communication link and the device processor may periodically determine whether the signal level of the Wi-Fi communication link meets the threshold signal level.

In response to determining that the signal level of the Wi-Fi communication link meets the threshold signal level (i.e., determination block 716="Yes"), the device processor may continue to conduct the first communication session using the first subscription and/or the second communication session using the second subscription via the Wi-Fi communication link in block 714, while periodically determining whether the signal level of the Wi-Fi communication link meets the threshold signal level in determination block 716.

In response to determining that the signal level of the Wi-Fi communication link does not meet the threshold signal level (i.e., determination block 716="No"), the device processor may remove the one or more protocol stack layers of the first subscription and/or the second subscription from the low power mode in block 718, and change the protocol stack of the first subscription and the protocol stack of the second subscription to a multi-standby mode in block 720. In the multi-standby mode, the protocol stacks of the first subscription and the second subscription may be configured to establish and/or conduct a communication session on one of the first subscription and the second subscription. The device processor may periodically allow an active subscription to access the shared RF resource of the MSMS communication device.

In block 722, the device processor may transfer the PDN connections of the first subscription to the first cellular communication link, and/or the PDN connections of the second subscription to the second cellular communication link. In some examples, when the PDN connections of the first subscription are transferred to the first cellular communication link, the device processor may conduct subsequent communication sessions using the first subscription over the first cellular communication link. In some examples, when the PDN connections of the second subscription are transferred to the second cellular communication link, the device processor may conduct subsequent communication sessions using the second subscription over the second cellular communication link.

The device processor may return to periodically monitoring the signal level of the Wi-Fi access point in determination block 406.

Figure 8:
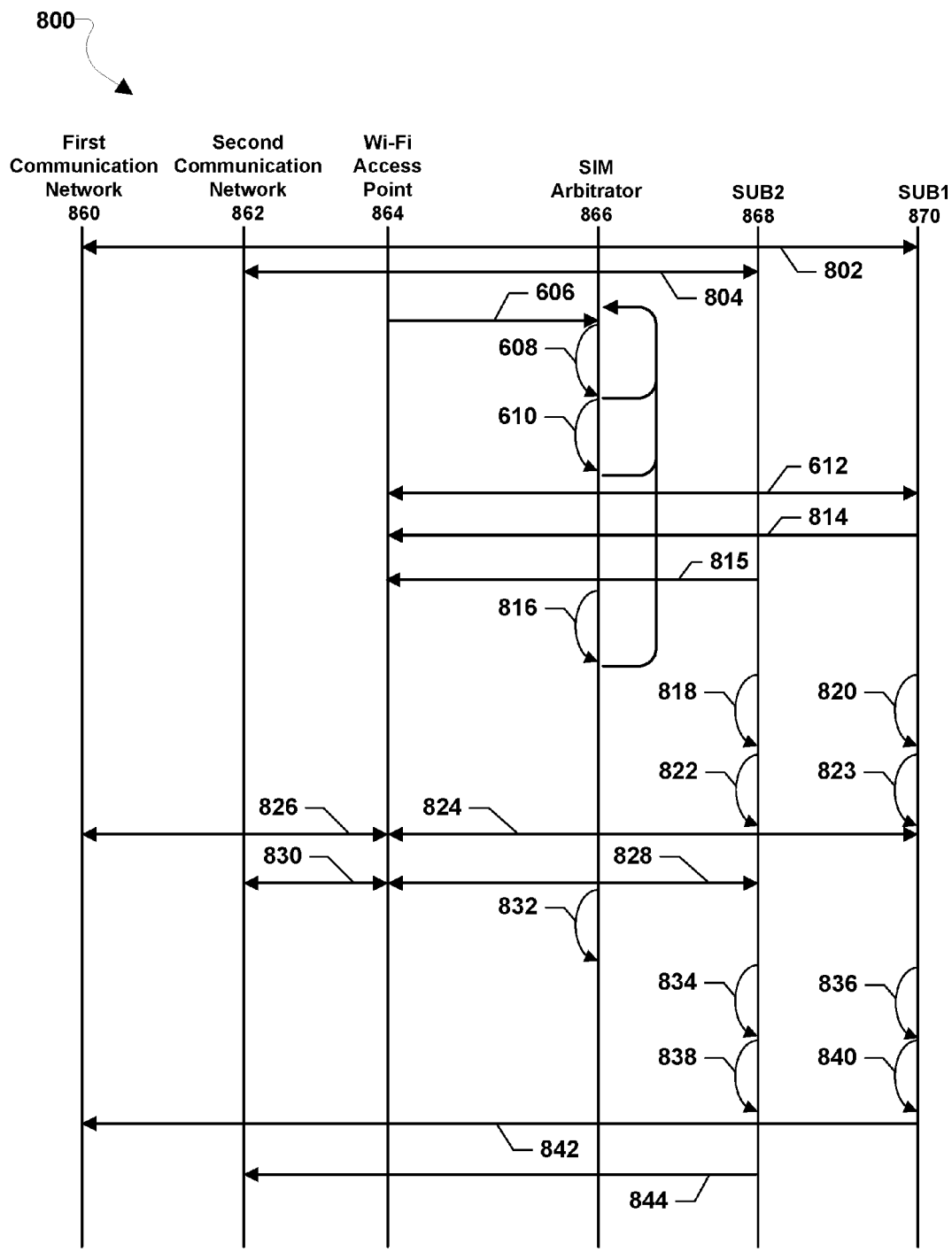
FIG. 8 is a message flow diagram illustrating a method for managing multi-active communication in a multi-subscription multi-standby communication device according to various examples.

FIG. 8 is a message flow diagram illustrating a method 800 for managing multi-active communication on an MSMS communication device according to some examples. With reference to FIGS. 2-8, the method 800 may be implemented by an MSMS communication device (e.g., the MSMS communication device 202, 300, 340), such as under the control of a processor (e.g., the general-purpose processor 306, the baseband processor 316, a separate controller, and/or the like) of the MSMS communication device (i.e., a "device processor").

In operation 802, the device processor may establish a first cellular communication link using a first subscription 870 (e.g., SUB1) with a first communication network 860 (which may be similar to the communication network 210).

In operation 804, the device processor may establish a second cellular communication link using a second subscription 868 (e.g., SUB2) with a second communication network 862 (which may be similar to the communication network 212). For example, a connectivity engine of the MSMS communication device (e.g., the connectivity engine 334) may establish and manage the first and second cellular communication links. In some examples, establishing the first or second cellular communication link may include establishing one or more PDN connections with an IMS (e.g., the IMS 228, 230).

In some examples, the MSMS communication device may be configured such that the first subscription and the second subscription may use the same RAT (for example, an LTE+LTE (L+L)-configured MSMS communication device). In such examples, only the first or second subscription may register with an IMS of a communication network (e.g., an IMS of a first communication network, or an IMS of the second communication network, respectively). For example, the second communication link with the second communication network 862 may include one or more suspended packet data network connections, and the first communication link with the first medication network 860 may include one or more active packet data network connections.

In operations 606-610, the device processor may perform operations of like-numbered operations of the method 600 as described with reference to FIG. 6. For example, the device processor may detect a signal 606 from a Wi-Fi access point 664 (which may be similar to the Wi-Fi access point 208). In operation 608, the device processor may determine whether the Wi-Fi signal meets a signal level threshold. In response to determining that the Wi-Fi signal does not meet the signal level threshold, the device processor may periodically monitor the signal level of the Wi-Fi access point to determine whether the signal level of the Wi-Fi signal 606 meets the threshold signal level.

In response to determining that the Wi-Fi signal does meet the signal level threshold, the device processor may determine whether one or more other criteria meet a respective threshold in operation 610. In response to determining that the one or more other criteria do not meet the respective threshold, the device processor may periodically monitor the signal level of the Wi-Fi access point to determine whether the signal level of the Wi-Fi signal 606 meets the threshold signal level.

In response to determining that the one or more other criteria meet the respective threshold, the device processor may establish a communication link 612 with the Wi-Fi access point 864.

In operation 814, the device processor may transfer one or more PDN connections of the first subscription to the Wi-Fi communication link 612.

In operation 815, the device processor may transfer one or more PDN connections of the second subscription to the Wi-Fi communication link 612.

In operation 816, the device processor may determine whether all PDN connections of the first subscription and the second subscription are transferred to the Wi-Fi communication link. In some examples, the SIM arbitrator 866 may determine whether all PDN connections of the first subscription are transferred to the Wi-Fi communication link 612. In response to determining that all PDN connections of the first subscription and the second subscription are not transferred to the Wi-Fi communication link, the device processor may periodically monitor the signal level of the Wi-Fi access point to determine whether the signal level of the Wi-Fi signal 606 meets the threshold signal level. In some examples, the device processor may make no change to any protocol stack (e.g., of the first or second subscription). In some examples, the device processor may decrease in arbitration priority of one of the first subscription and the second subscription, e.g., for cellular communication purposes.

In response to determining that all PDN connections of the first subscription and the second subscription are transferred to the Wi-Fi communication link, the device processor may change a protocol stack of the second subscription to multi-active mode in operation 818, and the device processor may change a protocol stack of the first subscription to multi-active mode in operation 820.

In operation 822, the device processor may place one or more layers of the second subscription protocol stack into a low power mode. In operation 823, the device processor may place one or more layers of the first subscription protocol stack into a low power mode.

The device processor may subsequently communicate 826 with the first communication network 860 using the first subscription 870 via the Wi-Fi access point 864. For example, the device processor may communicate via the Wi-Fi transceiver with the Wi-Fi access point 864 (communication 824), and via the Wi-Fi access point with the first communication network 860 (communication 826). The device processor may also communicate 828 with the second communication network 862 using the second subscription 868 via the Wi-Fi access point 864. For example, the device processor may communicate 828 with the Wi-Fi access point 864, and via the Wi-Fi access point the device processor may communicate 830 with the second communication network 862.

In operation 832, the device processor may periodically monitor the signal level of the Wi-Fi communication link. As long as the signal level of the Wi-Fi communication link meets the signal level threshold, the device processor may communicate with the first communication network 860 using the first subscription 870, and with the second communication network 862 using the second subscription 868, via the Wi-Fi access point 864.

In response to determining that the signal level of the Wi-Fi communication link does not meet the signal level threshold, the device processor may remove one or more protocol stack layers of the second subscription from the low power mode in operation 834. The device processor may also remove one or more protocol stack layers of the first subscription from the low-power mode in operation 836.

In operation 838, the device processor may change the protocol stack of the second subscription to a multi-standby mode. In operation 840, the device processor may change the protocol stack of the first subscription to the multi-standby mode.

In operation 842, the device processor may transfer the PDN connections of the first subscription to a cellular communication link with the first communication network 860. Subsequently, the device processor may conduct communications with the first communication network 860 over the cellular communication link with the first communication network.

In operation 844, the device processor may transfer the PDN connections of the second subscription to a cellular communication link with the second communication network 862. Subsequently, the device processor may conduct communications with the second communication network 862 over the cellular communication link with the second communication network.

Thus, the various examples may improve the operation of a multi-subscription multi-standby device by enabling the multi-subscription multi-standby device to manage multi-active communication operations dynamically. Managing multi-active communication dynamically may include dynamically enabling and conducting multi-active communications on the multi-subscription multi-standby communication device.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example. For example, one or more of the operations of the methods 400, 600, 700, and 800 may be substituted for or combined with one or more operations of the methods 400, 600, 700, and 800 and vice versa.

Figure 9:
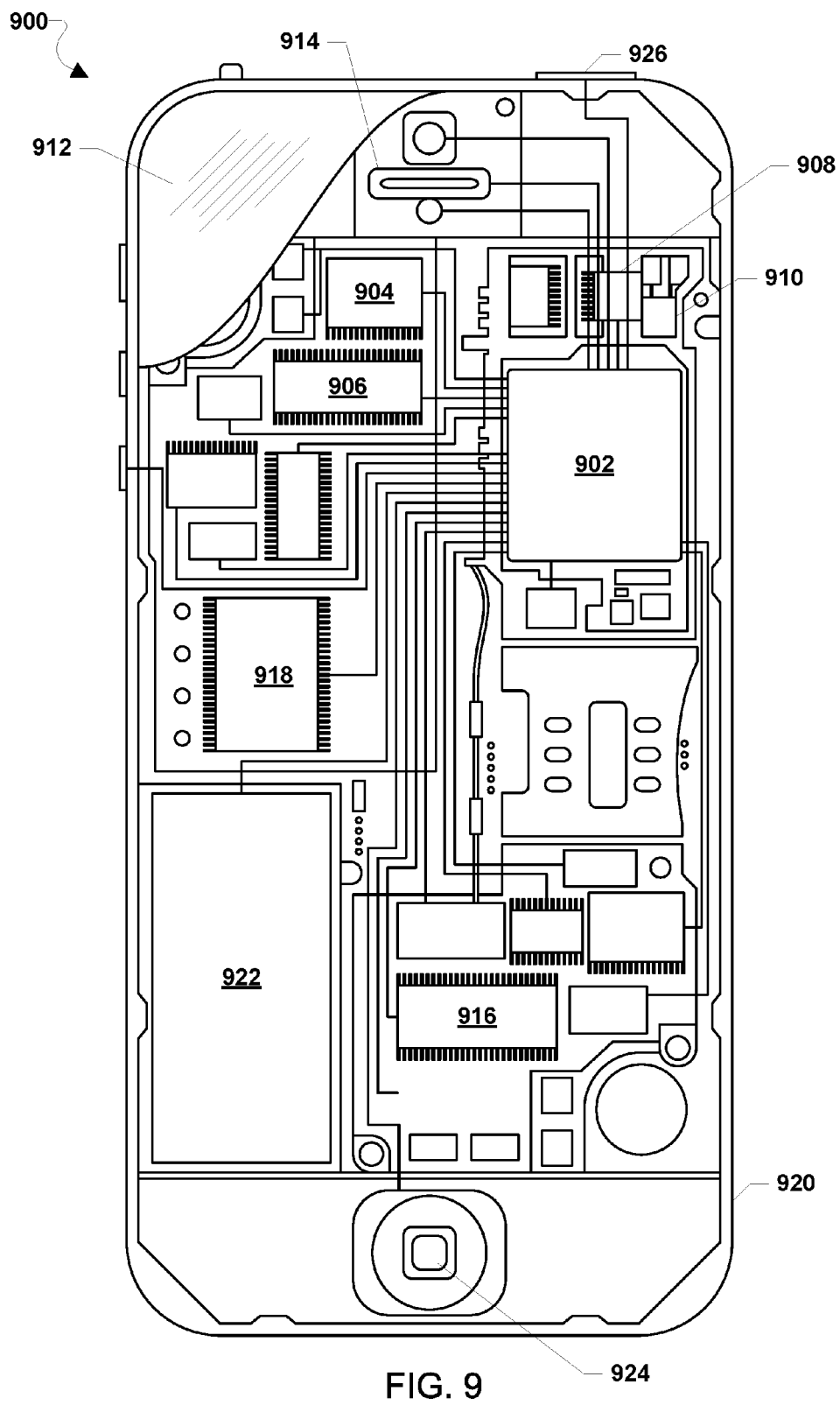
FIG. 9 is a component block diagram of a multi-subscription multi-standby communication device suitable for use with various examples.

Various examples (including, but not limited to, examples described with reference to FIGS. 2-8) may be implemented in any of a variety of MSMS communication devices, an example MSMS communication device 900 of which is illustrated in FIG. 9. With reference to FIGS. 2-9, in various examples, the MSMS communication device 900 (which may correspond, for example, to the MSMS communication devices 202, 300, and 340) may include a processor 902 coupled to a touchscreen controller 904 and an internal memory 906. The processor 902 may be one or more multi-core integrated circuits designated for general or specific processing tasks. The internal memory 906 may be volatile or non-volatile memory, and may also be secure and/or encrypted memory, or unsecure and/or unencrypted memory, or any combination thereof. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the MSMS communication device 900 need not have touch screen capability.

The MSMS communication device 900 may have two or more radio signal transceivers 908 (e.g., Peanut, Bluetooth, ZigBee, Wi-Fi, RF radio) and antennae 910, for sending and receiving communications, coupled to each other and/or to the processor 902. The transceivers 908 and antennae 910 may be used with the above-mentioned circuitry to implement the various wireless transmission protocol stacks and interfaces. The MSMS communication device 900 may include one or more cellular network wireless modem chip(s) 916 coupled to the processor and antennae 910 that enables communication via two or more cellular networks via two or more radio access technologies.

The MSMS communication device 900 may include a peripheral device connection interface 918 coupled to the processor 902. The peripheral device connection interface 918 may be singularly configured to accept one type of connection, or may be configured to accept various types of physical and communication connections, common or proprietary, such as USB, FireWire, Thunderbolt, or PCIe. The peripheral device connection interface 918 may also be coupled to a similarly configured peripheral device connection port (not shown).

The MSMS communication device 900 may also include speakers 914 for providing audio outputs. The MSMS communication device 900 may also include a housing 920, constructed of a plastic, metal, or a combination of materials, for containing all or some of the components discussed herein. The MSMS communication device 900 may include a power source 922 coupled to the processor 902, such as a disposable or rechargeable battery. The rechargeable battery may also be coupled to the peripheral device connection port to receive a charging current from a source external to the MSMS communication device 900. The MSMS communication device 900 may also include a physical button 924 for receiving user inputs. The MSMS communication device 900 may also include a power button 926 for turning the MSMS communication device 900 on and off.

The processor 902 may be any programmable microprocessor, microcomputer or multiple processor chip or chips that can be configured by software instructions (applications) to perform a variety of functions, including the functions of various examples described below. In some MSMS communication devices, multiple processors 902 may be provided, such as one processor dedicated to wireless communication functions and one processor dedicated to running other applications. Typically, software applications may be stored in the internal memory 906 before they are accessed and loaded into the processor 902. The processor 902 may include internal memory sufficient to store the application software instructions.

The foregoing method descriptions and the process flow diagrams are provided merely as illustrative examples and are not intended to require or imply that the blocks of various examples must be performed in the order presented. As will be appreciated by one of skill in the art the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various examples.

The hardware used to implement the various illustrative logics, logical blocks, modules, and circuits described in connection with the examples disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various examples, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed examples is provided to enable any person skilled in the art to make or use the present examples. Various modifications to these examples will be readily apparent to those skilled in the art, and the generic principles defined herein may be applied to other examples without departing from the scope of the examples. Thus, the various examples are not intended to be limited to the examples shown herein but are to be accorded the widest scope consistent with the following claims and the principles and novel features disclosed herein.

What is claimed is:

1. A method for managing multi-active communication on a multi-subscription multi-standby (MSMS) communication device, comprising:
   changing an operating mode of a first protocol stack of a first subscription and a second protocol stack of a second subscription of the MSMS communication device to a multi-active mode in response to determining that all of one or more packet data network connections of the first subscription are transferred to a Wi-Fi communication link.

2. The method of claim 1, further comprising:
   determining whether a signal level of the Wi-Fi communication link meets a threshold signal level; and
   transferring the one or more packet data network connections of the first subscription from a first cellular communication link to the Wi-Fi communication link in response to determining that the Wi-Fi communication link meets the threshold signal level.

3. The method of claim 2, wherein transferring the one or more packet data network connections of the first subscription from the first cellular communication link to the Wi-Fi communication link comprises establishing the one or more packet data network connections of the first subscription with an Internet protocol multimedia subsystem of a communication network.

4. The method of claim 2, further comprising:
monitoring the Wi-Fi communication link to determine whether the Wi-Fi communication link meets the threshold signal level; and
transferring the one or more packet data network connections of the first subscription from the Wi-Fi communication link to the first cellular communication link in response to determining that the Wi-Fi communication link does not meet the threshold signal level.

5. The method of claim 4, further comprising changing the first protocol stack and the second protocol stack to a multi-standby mode.

6. The method of claim 4, further comprising removing one or more layers of the first protocol stack from a low power mode.

7. The method of claim 2, wherein transferring one or more packet data network connections of the first subscription of the MSMS communication device from the first cellular communication link to the Wi-Fi communication link in response to determining that the Wi-Fi communication link meets the threshold signal level comprises transferring one or more packet data network connections of the first subscription from the first cellular communication link to the Wi-Fi communication link and transferring one or more packet data network connections of the second subscription from a second cellular communication link to the Wi-Fi communication link in response to determining that the Wi-Fi communication link meets the threshold signal level.

8. The method of claim 7, further comprising conducting a first communication session using the first subscription over the Wi-Fi communication link and a second communication session using the second subscription over the Wi-Fi communication link.

9. The method of claim 1, further comprising decreasing an arbitration priority of the first subscription in response to determining that not all of the one or more packet data network connections of the first subscription are transferred to the Wi-Fi communication link.

10. The method of claim 1, further comprising placing one or more layers of the first protocol stack in a low power mode.

11. The method of claim 1, further comprising conducting a first communication session using the first subscription over the Wi-Fi communication link and a second communication session using the second subscription over a second cellular communication link.

12. A multi-subscription multi-standby (MSMS) communication device, comprising:
a memory comprising a first protocol stack of a first subscription and a second protocol stack of a second subscription; and
a processor coupled to the memory and configured to:
change an operating mode of the first protocol stack of the first subscription and the second protocol stack of the second subscription of the MSMS communication device to a multi-active mode in response to determining that all of one or more packet data network connections of the first subscription are transferred to a Wi-Fi communication link.

13. The MSMS communication device of claim 12, wherein the processor is further configured to:
determine whether a signal level of the Wi-Fi communication link meets a threshold signal level; and
transfer the one or more packet data network connections of the first subscription of the MSMS communication device from a first cellular communication link to the Wi-Fi communication link in response to determining that the Wi-Fi communication link meets the threshold signal level.

14. The MSMS communication device of claim 13, wherein the processor is further configured to:
monitor the Wi-Fi communication link to determine whether the Wi-Fi communication link meets the threshold signal level; and
transfer the one or more packet data network connections of the first subscription from the Wi-Fi communication link to the first cellular communication link in response to determining that the Wi-Fi communication link does not meet the threshold signal level.

15. The MSMS communication device of claim 14, wherein the processor is further configured to change the first protocol stack and the second protocol stack to a multi-standby mode.

16. The MSMS communication device of claim 14, wherein the processor is further configured to remove one or more layers of the first protocol stack from a low power mode.

17. The MSMS communication device of claim 13, wherein the processor is further configured to transfer one or more packet data network connections of the first subscription of the MSMS communication device from the first cellular communication link to the Wi-Fi communication link in response to determining that the Wi-Fi communication link meets the threshold signal level by transferring one or more packet data network connections of the first subscription from the first cellular communication link to the Wi-Fi communication link and transferring one or more packet data network connections of the second subscription from a second cellular communication link to the Wi-Fi communication link in response to determining that the Wi-Fi communication link meets the threshold signal level.

18. The MSMS communication device of claim 17, wherein the processor is further configured to conduct a first communication session using the first subscription over the Wi-Fi communication link and a second communication session using the second subscription over the Wi-Fi communication link.

19. The MSMS communication device of claim 12, wherein the processor is further configured to decrease an arbitration priority of the first subscription in response to determining that not all of the one or more packet data network connections of the first subscription are transferred to the Wi-Fi communication link.

20. The MSMS communication device of claim 12, wherein the processor is configured to place one or more layers of the first protocol stack in a low power mode.

21. The MSMS communication device of claim 12, wherein the processor is further configured to conduct a first communication session using the first subscription over the Wi-Fi communication link and a second communication session using the second subscription over a second cellular communication link.

22. A multi-subscription multi-standby (MSMS) communication device, comprising:
means for changing an operating mode of a first protocol stack of a first subscription and a second protocol stack of a second subscription of the MSMS communication device to a multi-active mode in response to determining that all of one or more packet data network connections of the first subscription are transferred to a Wi-Fi communication link.

23. A non-transitory processor-readable storage medium having stored thereon processor-executable software instructions configured to cause a processor to perform operations for managing multi-active communication on a multi-subscription multi-standby (MSMS) communication device, comprising:
changing an operating mode of a first protocol stack of a first subscription and a second protocol stack of a second subscription of the MSMS communication device to a multi-active mode in response to determining that all of one or more packet data network connections of the first subscription are transferred to a Wi-Fi communication link.

24. The non-transitory processor-readable storage medium of claim 23, wherein the stored processor-executable software instructions are configured to cause a processor to perform operations further comprising:
determining whether a signal level of the Wi-Fi communication link meets a threshold signal level; and
transferring the one or more packet data network connections of the first subscription of the MSMS communication device from a first cellular communication link to the Wi-Fi communication link in response to determining that the Wi-Fi communication link meets the threshold signal level.

25. The non-transitory processor-readable storage medium of claim 24, wherein the stored processor-executable software instructions are configured to cause a processor to perform operations further comprising:
monitoring the Wi-Fi communication link to determine whether the Wi-Fi communication link meets the threshold signal level; and
transferring the one or more packet data network connections of the first subscription from the Wi-Fi communication link to the first cellular communication link in response to determining that the Wi-Fi communication link does not meet the threshold signal level.

26. The non-transitory processor-readable storage medium of claim 25, wherein the stored processor-executable software instructions are configured to cause a processor to perform operations further comprising changing the first protocol stack and the second protocol stack to a multi-standby mode.

27. The non-transitory processor-readable storage medium of claim 25, wherein the stored processor-executable software instructions are configured to cause a processor to perform operations further comprising removing one or more layers of the first protocol stack from a low power mode.

28. The non-transitory processor-readable storage medium of claim 23, wherein the stored processor-executable software instructions are configured to cause a processor to perform operations further comprising decreasing an arbitration priority of the first subscription in response to determining that not all of the one or more packet data network connections of the first subscription are transferred to the Wi-Fi communication link.

29. The non-transitory processor-readable storage medium of claim 23, wherein the stored processor-executable software instructions are configured to cause a processor to perform operations further comprising placing one or more layers of the first protocol stack in a low power mode.

30. The non-transitory processor-readable storage medium of claim 23, wherein the stored processor-executable software instructions are configured to cause a processor to perform operations further comprising conducting a first communication session using the first subscription over the Wi-Fi communication link and a second communication session using the second subscription over a second cellular communication link.

* * * * *